(12) United States Patent
Bromberg et al.

(10) Patent No.: US 10,177,997 B1
(45) Date of Patent: Jan. 8, 2019

(54) METHOD AND APPARATUS FOR PACKET AND BYTE COUNTING

(71) Applicant: Marvell Israel (M.I.S.L) Ltd., Yokneam (IL)

(72) Inventors: Dror Bromberg, Michmoret (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 432 days.

(21) Appl. No.: 14/933,466

(22) Filed: Nov. 5, 2015

Related U.S. Application Data

(60) Provisional application No. 62/075,416, filed on Nov. 5, 2014.

(51) Int. Cl.
*H04L 12/28* (2006.01)
*H04L 12/26* (2006.01)
*H04L 12/24* (2006.01)

(52) U.S. Cl.
CPC ............. *H04L 43/04* (2013.01); *H04L 41/06* (2013.01)

(58) Field of Classification Search
CPC ............................... H04L 43/04; H04L 41/06
USPC ......................................................... 370/412
See application file for complete search history.

(56) References Cited

U.S. PATENT DOCUMENTS

| | | | | |
|---|---|---|---|---|
| 2004/0218617 A1* | 11/2004 | Sagfors | ............... | H04L 41/0896 370/412 |
| 2006/0050722 A1* | 3/2006 | Bury | ................... | H04L 49/90 370/403 |
| 2008/0002708 A1* | 1/2008 | Isley | ................... | H04L 12/5601 370/395.1 |
| 2012/0093170 A1* | 4/2012 | Cantu | ................... | H04L 49/901 370/415 |
| 2013/0250762 A1* | 9/2013 | Assarpour | ............. | H04L 49/103 370/235 |
| 2015/0244639 A1* | 8/2015 | Iordache | ............. | H04L 47/2441 370/230 |

* cited by examiner

*Primary Examiner* — Ricky Ngo
*Assistant Examiner* — Ellen Kirillova

(57) ABSTRACT

A network device and a method for maintaining a count of network events in a network device are provided. A first memory is configured as a first counter, where the first counter is configured to store a least significant bit (LSb) portion of a count value. A second memory is configured as a second counter, where the second counter is configured to store a most significant bit (MSb) portion of the count value. Update circuitry is configured to (i) selectively increment or decrement the LSb portion of the count value stored in the first memory upon occurrence of an event, and (ii) selectively increment or decrement the MSb portion of the count value stored in the second memory upon occurrence of a wrap-around event in the first memory.

20 Claims, 11 Drawing Sheets

```
// FOR EXACT TAIL DROP
if (AMP==1)    // High Limit Check

Random Zone
        (  (!AL && BigDiff)   ||  (!AL && !BigDiff && (CounterLsb<0))   ||
           (!AL && !BigDiff && (CounterLsb>0) && (CounterLsb < Diff))  ||
           ( AL && !BigDiff && (CounterLsb<0) && (CounterLsb > Diff))  );

Drop Zone
        (  (AL && BigDiff)   ||  (!AL && !BigDiff && (CounterLsb>0))   ||
           (AL && !BigDiff && (CounterLsb<0) && (CounterLsb < Diff))  ||
           (!AL && !BigDiff && (CounterLsb>0) && (CounterLsb > Diff))  );

else if (AMP==0)    // Low Limit Check

Random Zone
        (  (AL && BigDiff)   ||  (AL && !BigDiff && (CounterLsb>0))   ||
           (AL && !BigDiff && (CounterLsb<0) && (CounterLsb < Diff))  ||
           (!AL && !BigDiff && (CounterLsb>0) && (CounterLsb > Diff))  );

Accept Zone
        (  (!AL && BigDiff)   ||  (!AL && !BigDiff && (CounterLsb<0))   ||
           (!AL && !BigDiff && (CounterLsb>0) && (CounterLsb < Diff))  ||
           (AL && !BigDiff && (CounterLsb<0) && (CounterLsb > Diff))  );
```

FIG. 4D

METHOD AND APPARATUS FOR PACKET AND BYTE COUNTING

CROSS-REFERENCE TO RELATED APPLICATIONS

This application claims priority to U.S. Provisional Patent Application No. 62/075,416, filed Nov. 5, 2014, entitled "Fast Counters," which is incorporated herein by reference in its entirety.

FIELD

The technology described herein relates generally to packet and packet byte counting and more particularly to packet and packet byte counting using first and second memories.

BACKGROUND

A network device, such as a switch, is tasked with counting a number of packets received by that network device as well as a number of bytes contained in those received packets. Certain hardware utilized in such counting have technical limitations, such as processing or access speed limitations that constrain counting capabilities.

The description above is presented as a general overview of related art in this field and should not be construed as an admission that any of the information it contains constitutes prior art against the present patent application.

SUMMARY

Examples of a network device and a method for maintaining a count of network events in a network device are provided. An example network device includes a first memory configured as a first counter, where the first counter is configured to store a least significant bit (LSb) portion of a count value. A second memory is configured as a second counter, and the second counter is configured to store a most significant bit (MSb) portion of the count value. Update circuitry is configured to (i) selectively increment or decrement the LSb portion of the count value stored in the first memory upon occurrence of an event, and (ii) selectively increment or decrement the MSb portion of the count value stored in the second memory upon occurrence of a wrap-around event in the first memory.

In an example method for maintaining a count of network events in a network device, a least significant bit (LSb) portion of a count value stored in a first memory is selectively incremented or decremented upon occurrence of a network event in the network device. A determination of whether a wrap-around event has occurred in the first memory is made. A most significant bit (MSb) portion of the count value stored in a second memory is selectively incremented or decremented based on a determination that the wrap-around event has occurred in the first memory.

An example network device includes a queue for temporarily storing packets received from a network. A counter is configured to store a count value that is indicative of a number of items stored on the queue or a total number of bytes contained in the items stored on the queue. A tail drop calendar module includes a memory configured to store an indication of a fullness level of the queue without storing the count value. The tail drop calendar also includes update circuitry configured to determine whether to accept or reject a packet received at the network device based on the indication of the fullness level. The count value is incremented based on a determination to accept the packet.

In an example method for managing a queue of a network device, packets received from a network are temporarily stored on a queue. A count value is stored in a counter. The count value indicates a number of items stored on the queue or a total number of bytes contained in the items stored on the queue. An indication of a fullness level of the queue is stored in a memory, and the indication does not include the count value. A determination of whether to accept or reject a packet received at the network device is based on the indication of the fullness level and without reading the count value stored by the counter. The count value is incremented based on a determination to accept the packet.

BRIEF DESCRIPTION OF THE DRAWINGS

FIG. 4D depicts example pseudo-code employed by a tail drop logic block, in accordance with an embodiment of the disclosure.

DETAILED DESCRIPTION

Figure 1:
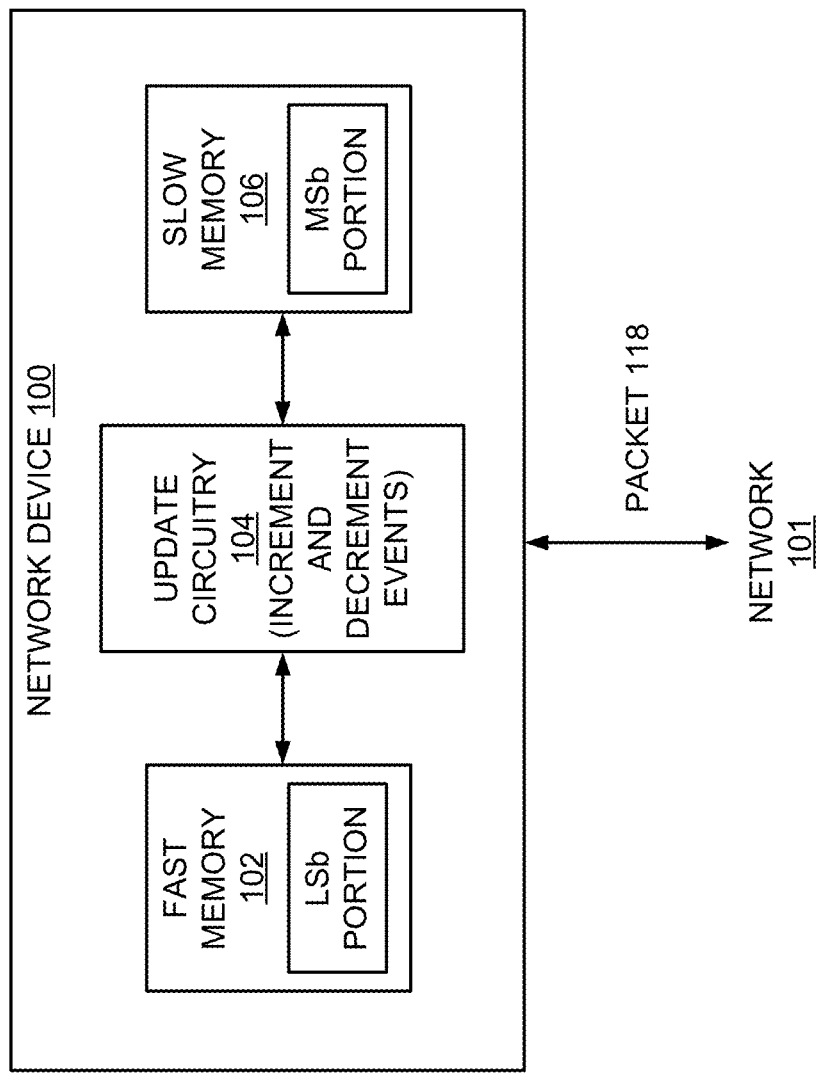
FIG. 1 is a diagram depicting a system for counting a number of packets stored on a queue of a network device and a number of bytes contained in the stored packets, in accordance with an embodiment of the disclosure.

A network device 100, such as a switch, is tasked with providing counters that count both a number of packets 118 stored at the network device 100 (e.g., a number of packets that are stored on a queue of the network device) as well as a number of bytes contained in those stored packets 118. Such packets 118 may be received at the network device 100 via a network 101, as illustrated in FIG. 1. In an example, the network device 100 includes a queue that is configured to store packets 118 received at the network device 100, and counters are used to count the number of packets stored on the queue and a total number of bytes contained in the packets stored on the queue. Oftentimes the network device 100 includes numerous such counters (e.g., hundreds or thousands of counters), with each of the counters associated with a particular queue. In some implementations, packets 118 are received at the network device 100 at a relatively high rate, requiring fast counting operations, such as read-write-modify memory operations.

A relatively fast memory, such as a memory comprising flip-flops, can provide sufficiently fast memory operations to keep up with the fast rate at which packets are received. However, such fast memory typically is comparatively expensive and unpractical for maintaining such packet and packet size counts for large numbers of counters over long periods of time. Thus, the number of bits available for allocation to each counter comprising fast memory is limited. A relatively slow memory, such as static random access memory (SRAM), provides larger, less expensive storage, in an embodiment. While the slow memory offers sufficient memory space for packet counting, those memories, in some embodiments, are not fast enough to handle high packet rates.

FIG. 1 is a diagram depicting a system for counting a number of packets 118 stored on a queue of a network device and a number of bytes contained in the stored packets, in accordance with an embodiment of the disclosure. The system of FIG. 1 utilizes both a relatively fast memory 102 and a relatively slow memory 106. In an example, the fast memory 102 comprises flip-flops (e.g., an array of flip-flops), and the slow memory 106 comprises SRAM. In an example, the fast memory 102 is disposed in an integrated circuit (e.g., on a first circuit substrate), and the slow memory 106 is external to the integrated circuit (e.g., on a second circuit substrate). In other examples, the fast and slow memories are disposed on the same integrated circuit or substrate. The fast memory 102 is configured as a first counter, in accordance with some embodiments. The first counter implemented in the fast memory 102 is configured to store a least significant bit (LSb) portion of a count value. In an example, the network device 100 includes a queue that is configured to store packets 118 received at the network device 100, and the count value indicates a total number of packets 118 stored on the queue or a total number of bytes contained in the packets 118 stored on the queue.

The slow memory 106 is configured as a second counter, in accordance with some embodiments. The second counter implemented in the slow memory 106 is configured to store a most significant bit (MSb) portion of the count value. Thus, the full count value is maintained across the fast and slow memories 102, 106, with one portion of the count value being stored on the fast memory 102 (e.g., the LSb portion) and another portion being stored on the slow memory 106 (e.g., the MSb portion). In an example, to maintain a count value of 854,329, the fast memory 102 stores data representing the LSb portion of "329," and the slow memory 106 stores data representing the MSb portion of "854."

The system of FIG. 1 also includes update circuitry 104 configured to increment or decrement the LSb portion of the count value stored in the fast memory 102 upon occurrence of an event. The event is an acceptance of a packet at the network device 100 or a transmission of a packet from the network device 100, in accordance with some embodiments. When the event is an acceptance of a packet at the network device 100, the update circuitry 104 increments the LSb portion of the count value based upon the occurrence of this event. When the event is a transmission of a packet from the network device 100, and the update circuitry 104 decrements the LSb portion of the count value based upon the occurrence of this event.

The update circuitry 104 also is configured to increment or decrement the MSb portion of the count value stored in the slow memory 106 upon occurrence of a wrap-around event in the fast memory 102. When the wrap-around event is the wrapping around of the LSb portion from a high value to a low value (e.g., wrapping around from "999" to "000"), the update circuitry 104 increments the MSb portion of the count value based upon the occurrence of this wrap-around event. Specifically, the MSb portion is incremented by 1. When the wrap-around event is the wrapping around of the LSb portion from a low value to a high value (e.g., wrapping around from "000" to "999"), the update circuitry 104 decrements the MSb portion of the count value based upon the occurrence of this event. Specifically, the MSb portion is decremented by 1. To update the MSb portion of the count value, the update circuitry 104 includes a queue that stores information about wrap-around events, in examples. The use of such a queue is described below with reference to FIG. 2, which includes a queue 208.

The storing of the LSb and MSb portions across two memories and the selective incrementing or decrementing of the MSb portion by 1 upon occurrence of a wrap-around event are in contrast to conventional systems. For example, in conventional systems, a total count value is stored on a first memory, and a subtotal of the count value is stored on a second memory. In these conventional systems, the total count value is updated periodically by adding the subtotal to the previously-stored total value (e.g., new_total=old_total+subtotal). The conventional systems do not store LSb and MSb portions across two memories, as described herein. Further, the conventional systems' methods of updating the total count value (e.g., via the addition procedure noted above) are in contrast to the approaches described herein, which include selectively incrementing or decrementing the MSb portion of the count value by 1 upon occurrence of a wrap-around event.

As noted above, the network device 100 includes a queue that is configured to store packets 118 accepted at the network device 100, in an example. The system of FIG. 1 utilizes certain features of the fast memory 102 and the slow memory 106 to maintain an accurate count of the number of packets stored on the queue and the number of bytes contained in the packets stored on the queue, despite a potential for a high rate of receipt and transmission of data packets 118 at the network device 100. The system utilizes the fast operational capabilities of the memory 102 to maintain the LSb portion of the count value. Thus, even if packets are added to or removed from the queue at a high rate, the memory 102 can provide sufficiently fast memory operations to keep up with the fast rate of packet receipt or transmission and thus enable the LSb portion of the count value to be accurate. Due to the expense of storage in the fast memory 102, only the LSb portion of the count value is maintained in the fast memory 102.

The MSb portion of the count value is maintained in the slow memory 106, and this portion of the count value is accessed by the update circuitry 104 only when the LSb portion wraps around, as described above. In this manner, accessing of the slow memory 106 occurs only intermittently (e.g., upon occurrence of a wrap-around event in the fast memory 102) and does not occur each time that the count value changes. The update circuitry 104 is configured, in embodiments, to perform other operations, such as resetting the LSb portion of the count value stored in the fast memory 102 upon occurrence of a wrap-around event in the fast memory 102. The update circuitry 104 is also configured, in embodiments, to implement an algorithm for determining whether a packet received at the network device 100 should be accepted or rejected. These features of the update circuitry 104 are described in further detail below.

As indicated above, the systems and methods described herein enable the count value to be both incremented and decremented. Specifically, the count value is incremented when a packet is added to the queue at the network device, and the count value is decremented when a packet is removed from the queue. This is in contrast to conventional systems, which permit only monotonic counting (e.g., counter value can only be incremented or decremented, but not both). It is further noted that the systems and methods described herein enable the count value to be updated by a value of one and also by values greater than one. For example, the count value indicates a total number of bytes contained in packets stored on a queue in examples, such that when a packet having multiple bytes is added to the queue, the count value increases by a value that is greater than one.

Figure 2:
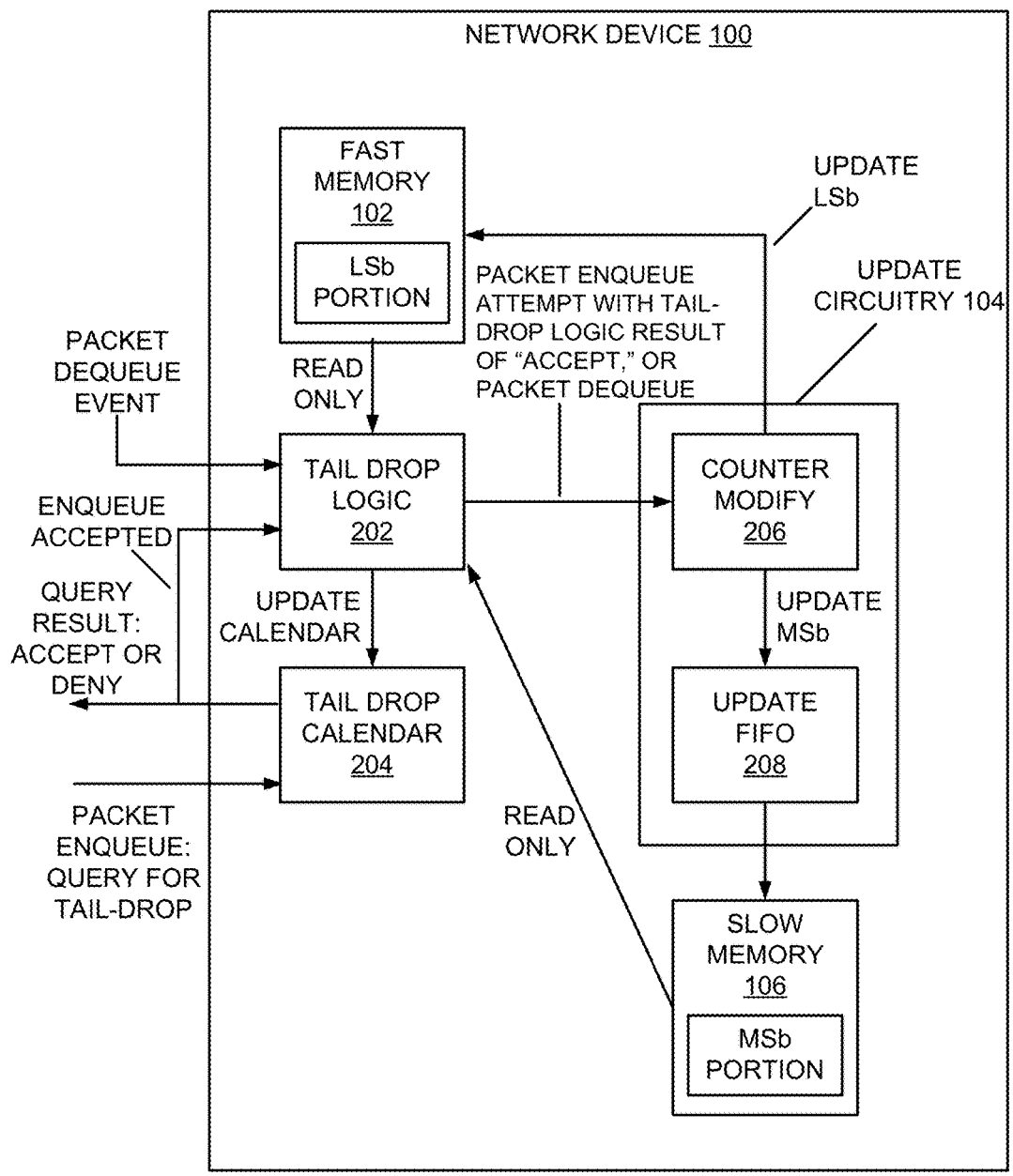
FIG. 2 is a diagram depicting additional details of the system of FIG. 1, in accordance with an embodiment of the disclosure.

FIG. 2 is a diagram depicting additional details of the system of FIG. 1, in accordance with an embodiment of the disclosure. In FIG. 2, tail drop logic 202 is configured to implement an algorithm for determining whether a packet received at the network device 100 should be accepted or rejected. In an embodiment, the tail drop logic 202 is implemented entirely in hardware elements and does not utilize software intervention. In other examples, the tail drop logic 202 is implemented via a combination of hardware and software (e.g., software or firmware executed in a processor), or entirely in software or firmware. In determining whether a packet should be accepted or rejected, the tail drop logic 202 accesses data stored in a tail drop calendar 204. This is indicated in FIG. 2, which shows that when a packet enqueue decision is to be made (e.g., a decision on whether a received packet should be added to a queue of the network device 100, where the queue is configured to temporarily store packets at the network device 100), the tail drop calendar 204 is queried. As a result of the query, an accept or deny indication is generated by the tail drop calendar 204, as shown in the figure. Further, if the packet enqueue is accepted, an "enqueue accepted" indication is received at the tail drop logic 202 from the tail drop calendar 204. The use of the tail drop calendar 204 in determining whether a packet should be enqueued is explained in further detail below. As shown in FIG. 2, the tail drop logic 202 is further configured to receive packet dequeue events. The dequeueing of packets from a queue is explained in further detail below. In an example, the tail drop calendar 204 comprises a relatively fast memory, such as a memory comprising flip-flops (e.g., an array of flip-flops).

The determination of whether to accept or reject a packet received at the network device 100 is based on an indication of whether a queue (e.g., a queue configured to store packets received at the network device 100) has sufficient space to store the packet, in some embodiments. As described above with reference to FIG. 1, a count value maintained using the fast and slow memories 102, 106 indicates a total number of packets stored on the queue or a total number of bytes contained in the packets stored on the queue. Thus, the full count value, including both the LSb and MSb portions, would provide sufficient information for determining whether to accept or reject the packet. However, because packets are received at the network device 100 at a high rate, it is not practical to access the relatively slow memory 106 to determine the MSb portion of the count value each time that a packet is received. The tail drop logic 202 and tail drop calendar 204 are used to overcome this problem.

Specifically, the tail drop calendar 204 comprises a relatively fast memory that stores control bits. The control bits provide an indication of a fullness level of the queue without storing the full count value. The tail drop logic 202 makes the determination of whether to accept or reject a packet received at the network device 100 on the basis of data stored in the tail drop calendar 204 and without reading the count value stored across the fast and slow memories 102, 106. The tail drop logic 202 thus makes the determination of whether to accept or reject the packet based on the indication of the fullness level of the queue stored in the tail drop calendar 204, which is a relatively fast memory, and without accessing the relatively slow memory 106. The tail drop logic 202 utilizes the fast operational capabilities of the tail drop calendar 204 to quickly retrieve data indicating whether the packet should be accepted or rejected. In examples, even if packets are received at the network device 100 at a high rate, the tail drop calendar 204 can provide sufficiently fast memory operations to keep up with the high rate and enable acceptance/rejection decisions to be made in a timely manner and without the need to access the slow memory 106. In examples, the indication of the fullness level stored in the tail drop calendar 204 includes fewer bits of data than the count value stored across the fast and slow memories 102, 106.

As noted above, the tail drop calendar 204 stores control bits that provide an indication of a fullness level of the queue. In examples, data stored in the tail drop calendar 204 is updated when the MSb portion of the count value is updated in the slow memory 106. In one implementation, the indication of the fullness level of the queue includes one or more values that indicate how the MSb portion of the count value compares to one or more thresholds. In this example, referred to herein as the "approximate comparison" tail drop mechanism, the indication of the fullness level is not based on the LSb portion of the count value. Thus, in updating the data stored in the tail drop calendar 204, the MSb portion of the count value is compared to the one or more thresholds, and data stored in the tail drop calendar 204 is updated based on one or more results of the comparing. As noted above, this updating of the tail drop calendar 204 occurs when the MSb portion of the count value is updated in the slow memory 106.

As an example of this implementation, upon updating the MSb portion of the count value in the slow memory 106, the updated MSb portion is compared to a single threshold value. If the MSb portion is greater than or equal to the threshold value, then the tail drop calendar 204 stores an indication that received packets should be rejected at the network device. Conversely, if the MSb portion is less than the threshold value, then the tail drop calendar 204 stores an indication that packets should be accepted at the network device. The tail drop logic 202 determines whether to accept or reject received packets based on the indication stored in the tail drop calendar 204. Although this example uses a single threshold, in other examples, the MSb portion is compared to multiple threshold values.

In an example, upper and lower thresholds are used, such that the indication of the fullness level indicates how the MSb portion of the count value compares to both of these thresholds. If the MSb portion is below the upper threshold and below the lower threshold, then the tail drop calendar 204 stores one or more values indicating such, and the tail drop logic 202 determines that received packets should be accepted based on the one or more values. If the MSb portion is above the upper threshold and above the lower threshold, then the tail drop calendar 204 stores one or more values indicating such, and the tail drop logic 202 determines that received packets should be rejected based on the one or more values. If the MSb portion is above the lower threshold and below the upper threshold, then the tail drop calendar 204 stores one or more values indicating such, and the tail drop logic 202 makes the determination of whether to accept or reject a received packet based on the one or more values and additional information (e.g., a probability value stored in the tail drop calendar 204), in examples. Examples of such additional information are described in greater detail below with reference to FIGS. 4A-4D. Although this example uses two thresholds, in other examples, more than two thresholds are used.

In the approximate comparison tail drop mechanism described above, the indication of the fullness level of the queue stored in the tail drop calendar 204 is based on the MSb portion of the count value and not based on the LSb portion of the count value. In other examples, the indication of the fullness level is based on the full count value stored across the fast and slow memories 102, 106. In these other examples, an "exact comparison" tail drop mechanism is used. In one such example, the indication of the fullness level of the queue includes one or more values that indicate how the full count value compares to one or more thresholds. Thus, in updating the data stored in the tail drop calendar 204, the full count value stored across the fast and slow memories 102, 106 is compared to the one or more thresholds, and data stored in the tail drop calendar 204 is updated based on one or more results of the comparing. In examples, the updating of the tail drop calendar 204 occurs when the MSb portion of the count value is updated in the slow memory 106, as noted above. Further details on the exact comparison tail drop mechanism are described below with reference to FIGS. 4A-4D.

As illustrated in FIG. 2, the tail drop logic 202 transmits commands to a counter modify block 206. If there has been a packet enqueue attempt with a tail drop logic result of "accept," then the tail drop logic 202 transmits an increment command to the counter modify block 206. Based on the increment command, the counter modify block 206 increments the LSb portion of the count value stored in the fast memory 102. As noted above, the tail drop logic 202 receives packet dequeue events. Based on such a packet dequeue event, the tail drop logic 202 transmits a decrement command to the counter modify block 206. Based on the decrement command, the counter modify block 206 decrements the LSb portion of the count value stored in the fast memory 102.

When the LSb portion of the count value wraps around from a high value to a low value (e.g., a "full" wrap-around event occurs), an "increment" command is added to a queue 208. Likewise, when the LSb portion of the count value wraps around from a low value to a high value (e.g., an "empty" wrap-around event occurs), a "decrement" command is added to the queue 208. In the example of FIG. 2, the counter modify block 206 commands the updating of the slow memory 106 by adding an entry to the queue 208. If the entry is an "increment" command, the MSb portion of the count value stored in the slow memory 106 is incremented by 1, and if the entry is a "decrement" command, the MSb portion of the count value is decremented by 1. As illustrated in FIG. 2, the queue 208 is a first-in-first-out (FIFO) queue and may be referred to herein as the "update FIFO." The queue 208 comprises an array of flip-flops, in an example.

When the MSb portion of the count value is updated as described above, the LSb portion of the count value stored in the fast memory 102 is reset to a random value, in examples. The counter modify block 206 performs this resetting, in examples. In network devices having multiple counters, the use of random values helps to avoid a situation where multiple LSb counters wrap around at the same time. In some examples, the slow memory 106, in addition to maintaining a counter storing the MSb portion of the count value, also maintains a counter storing the LSb portion of the count value. In these examples, the random value is sent to the update FIFO 208 for updating the LSb portion of the count value maintained in the slow memory 106.

In some examples, multiple clients use the components of the network device 100. A first client utilizes the tail drop logic 202 and tail drop calendar 204, in examples. The first client transmits the packet dequeue and enqueue events to the tail drop logic 202 and the tail drop calendar 204, respectively. The first client receives the query result of "accept" or "deny" from the tail drop calendar 204. A second client utilizes the fast memory 102, slow memory 106, counter modify block 206, and update FIFO 208, in examples. The second client is responsible for updating the LSb and MSb portions of the count value stored in the memories 102, 106 and uses the counter modify block 206 and update FIFO 208 to do this.

Figure 3A:
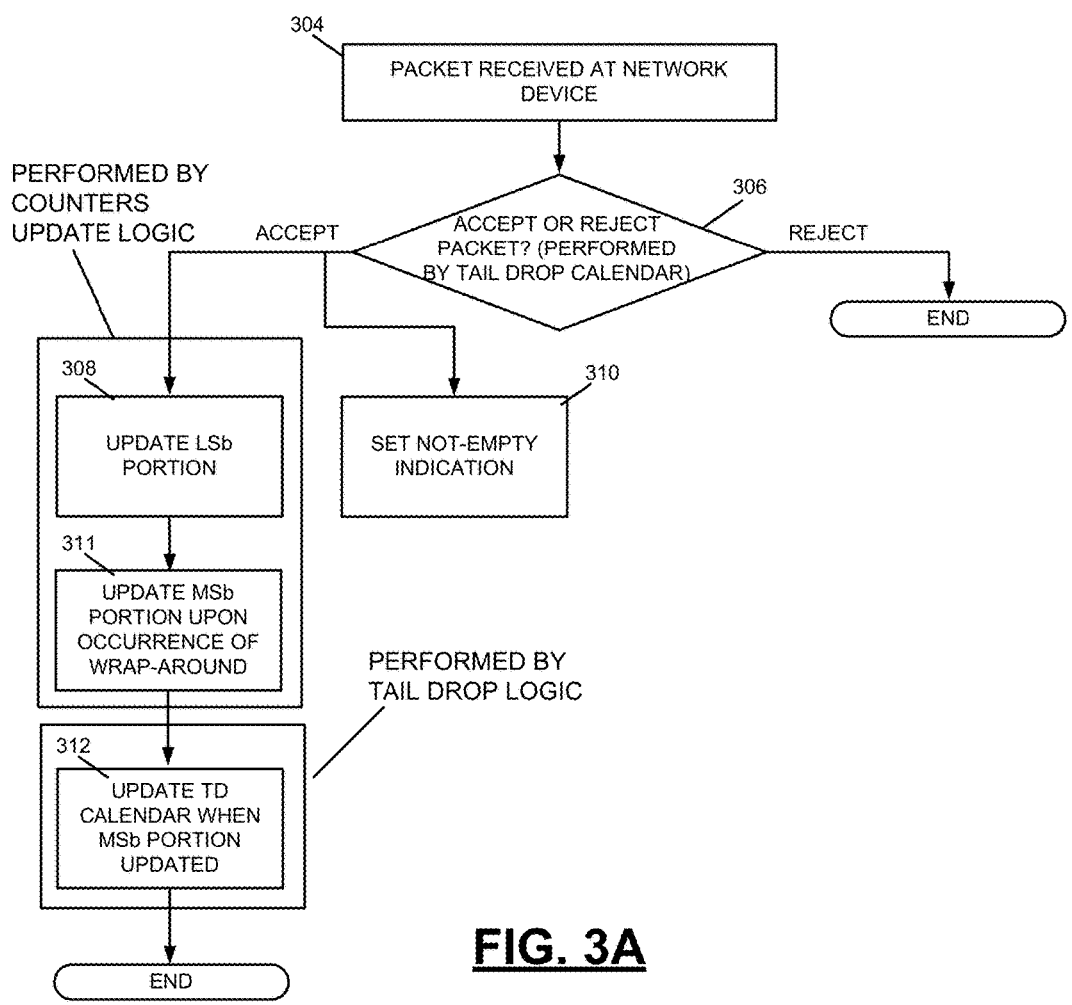
FIG. 3A is a flow diagram depicting steps of an example method that is utilized upon receipt of a packet at the network device of FIGS. 1 and 2, in accordance with an embodiment of the disclosure.

FIG. 3A is a flow diagram depicting steps of an example method that is utilized upon receipt of a packet at the network device 100 of FIGS. 1 and 2, in accordance with an embodiment of the disclosure. At 304, the packet is received at the network device. At 306, a determination of whether to accept or reject the packet is made. The determination at 306 is performed by the tail drop calendar, as described herein. If it is determined at 306 that the packet should be accepted, the packet may be added to a queue of the network device. As described herein, a count value including LSb and MSb portions stored on respective fast and slow memories indicates a total number of packets stored on the queue or a total number of bytes contained in the packets stored on the queue.

If it is determined at 306 that the packet should be accepted, at 308, the LSb portion of the count value stored in the fast memory is incremented. At 310, a "not-empty" indication is set. The not-empty indication indicates that the queue is not empty and is stored in a memory as one or more bits, in embodiments. The not-empty indicator is described in further detail below with reference to FIG. 5. The updating of the LSb portion at 308 and the setting of the not-empty indication at 310 are performed in parallel, in examples, as indicated in the figure. If the incrementing of the LSb portion causes a wrap-around event to occur, at 311, the MSb portion of the count value stored in slow memory is incremented by 1. When the MSb portion is updated, the LSb portion is reset to a new value, such as a random value, in examples. The actions at 308 and 311 are performed by counter update logic, as indicated in the figure. At 312, when the MSb portion of the count value is incremented, data stored in a tail drop calendar memory is updated. The updating of the tail drop calendar at 312 is performed by the tail drop logic, as shown in the figure. If it is determined at 306 that the packet should not be accepted, steps 308, 310, 312 are not performed.

Figure 3B:
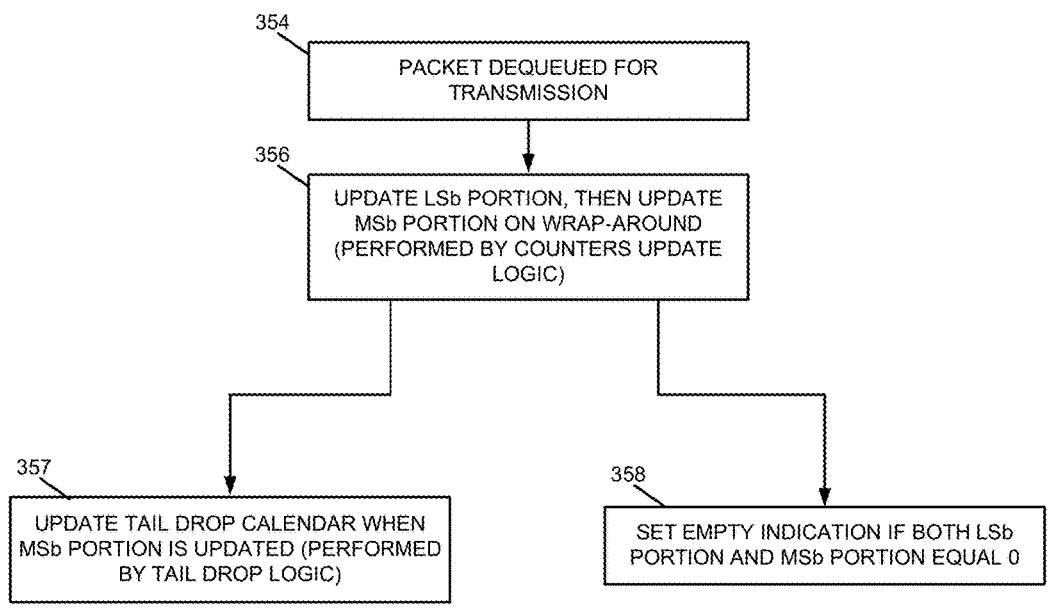
FIG. 3B is a flow diagram depicting steps of an example method that is utilized when a packet is transmitted from the network device of FIGS. 1 and 2, in accordance with an embodiment of the disclosure.

FIG. 3B is a flow diagram depicting steps of an example method that is utilized when a packet is transmitted from the network device 100 of FIGS. 1 and 2, in accordance with an embodiment of the disclosure. At 354, the packet is transmitted from the network device. In transmitting the packet, the packet may be removed (e.g., dequeued) from a queue of the network device, as shown in the figure. As described herein, a count value including LSb and MSb portions stored on respective fast and slow memories indicates a total number of packets stored on the queue or a total number of bytes contained in the packets stored on the queue. At 356, the count value is updated based on the dequeuing of the packet. Specifically, the LSb portion of the count value stored in fast memory is decremented. If the decrementing of the LSb portion causes a wrap-around event to occur, the MSb portion of the count value stored in slow memory is decremented by 1. The updating of the count value at 356 is performed by counters update logic, as shown in the figure. When the MSb portion is decremented, the LSb portion is reset to a new value (e.g., a new random value), in examples. At 357, when the MSb portion is decremented, data stored in the tail drop calendar memory is updated. The updating of the data stored in the tail drop calendar memory is performed by the tail drop logic, as shown in the figure. At 358, an "empty" indication is set if both the LSb and MSb portions of the count value are equal to zero. The empty indication indicates that the queue is empty and is stored in a memory as one or more bits, in embodiments. The empty indicator is described in further detail below with reference to FIG. 5. The steps 357 and 358 are performed in parallel, in examples, as shown in the figure.

FIGS. 4A-4D describe features of a tail drop algorithm and tail drop calendar used in determining whether to accept or reject a packet received at a network device. As described herein, the network device includes a queue configured to store packets received at the network device, and a count value maintained in the network device tracks a total number of packets stored on the queue or a total number of bytes contained in the packets stored on the queue. An LSb portion of the count value is stored in a relatively fast memory, and an MSb portion of the count value is stored in a relatively slow memory. In determining whether to accept or reject a packet received at the network device, it is not practical to (i) read the full count value from the fast and slow memories, and (ii) make the accept/reject decision based on the full count value. Packets are received at the network device at a relatively high rate, and the MSb portion of the count value cannot be read from the slow memory at a sufficiently fast rate.

To overcome this issue, the tail drop algorithm and tail drop calendar are used. The tail drop calendar comprises a relatively fast memory (e.g., a memory comprising an array of flip-flops) that stores control bits. The control bits provide an indication of a fullness level of the queue without storing the full count value. Thus, the determination of whether to accept or reject a packet received at the network device can be made on the basis of data stored in the tail drop calendar and without a need to access the MSb portion of the count value stored in the slow memory. In an example, the data stored in the tail drop calendar is updated each time the MSb portion of the count value is updated by comparing the full count value or a portion of the count value (e.g., the MSb portion) to one or more thresholds. The control bits of the tail drop calendar provide an indication of how the count value or the portion of the count value compares to the one or more thresholds.

Figure 4A:
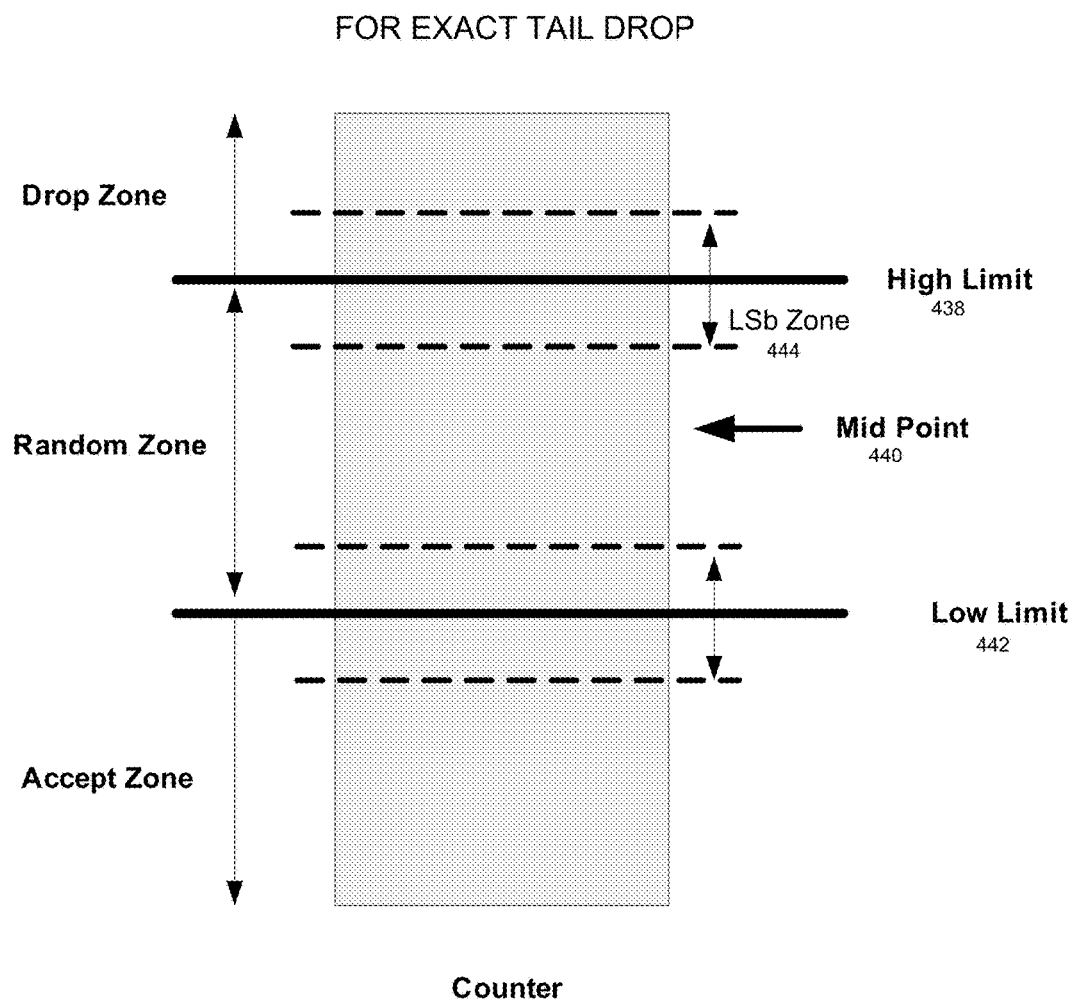
FIG. 4A depicts high and low limits utilized in conjunction with data of a tail drop calendar to determine whether to accept or reject a packet received at a network device, in accordance with an embodiment of the disclosure.
Figure 4B:
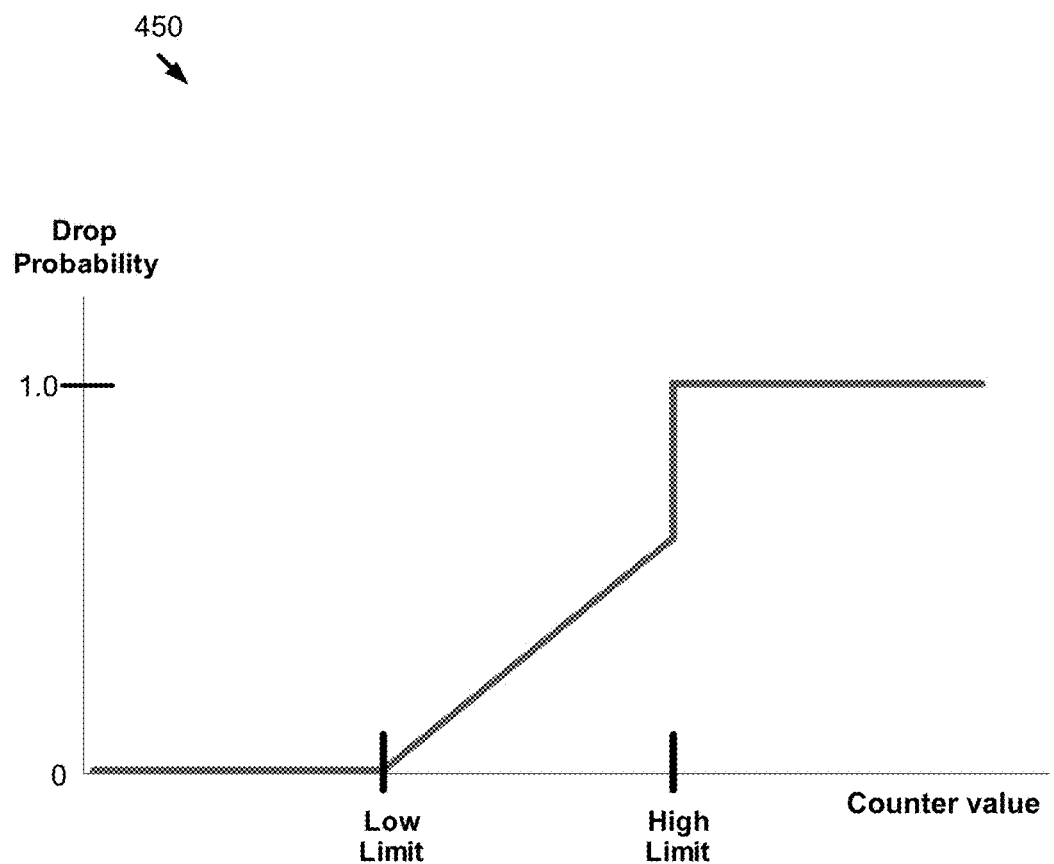
FIG. 4B is a graph depicting a probability that a packet will be rejected as a function of a count value, in accordance with an embodiment of the disclosure.

In an example, the one or more thresholds include a high limit value and a low limit value. To illustrate the use of such high and low limit values, reference is made to FIG. 4A, which depicts high and low limits 438, 442. It is noted that the example of FIG. 4A is applicable to the exact comparison tail drop mechanism described herein and may not be applicable to the approximate comparison tail drop mechanism. If the count value is above the high limit 438, a packet received at the network device should be dropped (e.g., rejected, not accepted). When the count value is above the high limit 438, this indicates that a queue associated with the count value is full or nearly full. Conversely, if the count value is below the low limit 442, a packet received at the network device should be accepted. When the count value is below the low limit 442, this indicates that the queue associated with the count value has ample room and is not close to being full. When the count value is between the high and low limits 438, 442, the accept/drop decision is randomized according to a probability value, as described below. FIG. 4A denotes the count values between the high and low limits 438, 442 as being in a "random zone."

In an example, when in the random zone, there is a positive relationship between the count value and the probability that a received packet will be dropped (e.g., the closer the count value is to the high limit 442, the higher the drop probability). To illustrate this, reference is made to FIG. 4B. This figure is a graph 450 depicting a probability that a packet will be rejected as a function of the count value, in accordance with an embodiment of the disclosure. As illustrated the graph 450, for count values below the low limit 442, the drop probability is equal to zero, such that a received packet is accepted. For count values above the high limit 438, the drop probability is equal to one, such that the received packet is rejected. For count values between the high and low limits 438, 442, there is a positive relationship between the count value and the drop probability, as illustrated in the figure. It is noted that the shape of the graph between the high and low limit values 438, 442 varies in other examples.

Figure 4C:
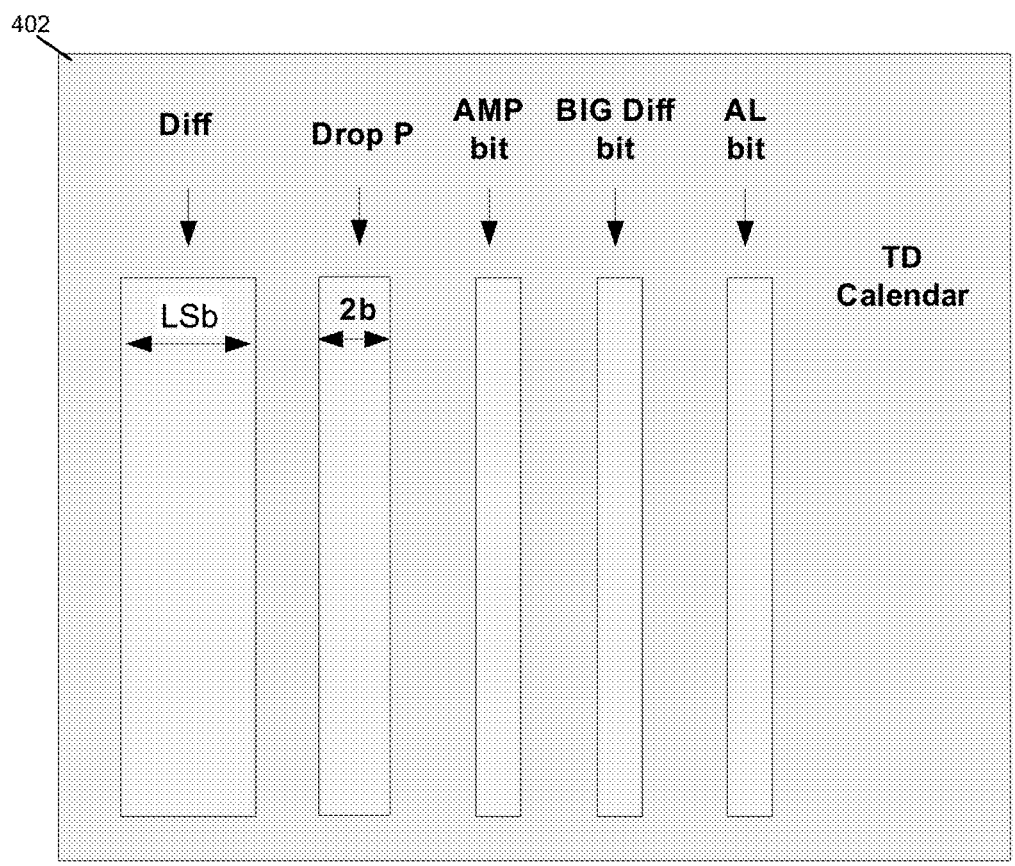
FIG. 4C depicts fields of a tail drop calendar, in accordance with an embodiment of the disclosure.

FIG. 4C depicts fields of a tail drop calendar 402, in accordance with an embodiment of the disclosure. Data stored in the tail drop calendar 402 provides an indication of how the count value compares to the high and low limits. It is noted that the example fields of the tail drop calendar 402 of FIG. 4C are applicable to the exact comparison tail drop mechanism described herein and may not be applicable to the approximate comparison tail drop mechanism. In examples, the approximate comparison tail drop mechanism does not utilize such fields stored in a relatively fast memory. To provide the indication of how the count value compares to the high and low limits, the tail drop calendar 402 includes fields "Diff," "Drop Probability," "Above Mid Point (AMP)," "Big Difference," and "Above Limit (AL)." The Above Mid Point (i.e., AMP) field indicates whether the count value is above a midpoint value between the high and low limits. The AMP field is a binary value store stored in a single bit of memory, in an embodiment. With reference again to FIG. 4A, midpoint 440 is the midpoint between the high and low limits 438, 442.

The Above Limit (i.e., AL) field of the tail drop calendar 402 indicates whether the count value is above the high limit or the low limit. Specifically, if the AMP field indicates that the count value is above the midpoint value, then the AL field indicates whether the count value is above the high limit. Conversely, if the AMP field indicates that the count value is below the midpoint value, then the AL field indicates whether the count value is above the low limit. The AL field is a binary value store stored in a single bit of memory, in an embodiment.

The Big Difference (i.e., BigDiff) field of the tail drop calendar 402 indicates whether a difference between the count value and the high limit or the low limit is greater than a predetermined amount. Specifically, if the AMP field indicates that the count value is above the midpoint value, then the BigDiff field indicates whether a difference between the count value and the high limit is greater than a predetermined amount. Conversely, if the AMP field indicates that the count value is below the midpoint value, then the BigDiff field indicates whether a difference between the count value and the low limit is greater than a predetermined amount. The BigDiff field is a binary value store stored in a single bit of memory, in an embodiment. In an example, the BigDiff field is based on a comparison of (i) the absolute value of the difference between the count value and the high or low limit, and (ii) the predetermined amount. To illustrate an example of the predetermined amount, reference is made to FIG. 4A. This figure shows an "LSb zone" 444 above and below each of the high and low limits 438, 442. In examples, the predetermined amount is double the LSb zone 444 (i.e., 2*LSb_zone).

The Difference (i.e., Diff) field of the tail drop calendar 402 indicates the difference between the count value and the high or low limit. Specifically, if the AMP field indicates that the count value is above the midpoint value, then the Diff field indicates the difference between the count value and the high limit. Conversely, if the AMP field indicates that the count value is below the midpoint value, then the Diff field indicates the difference between the count value and the low limit. In an example, the value stored in the Diff field is always a positive number (e.g., the Diff field holds the absolute value of the difference). The Diff field is stored in multiple bits of memory, in an embodiment. In examples, the Diff field is stored in n bits of memory, where n is the number of bits used in storing the LSb portion of the count value in the fast memory.

The Drop Probability field of the tail drop calendar 402 indicates the probability that a received packet will be dropped. As described above with reference to FIG. 4B, this probability is based on the count value (e.g., higher count value indicates higher drop probability). In examples, the value of the Drop Probability field is set based on a predetermined function or set of functions, such as those illustrated in FIG. 4B. The predetermined function or set of functions indicate, in an example, that the Drop Probability is (i) 0 for count values below the low limit, (ii) 1.0 for count values above the high limit, and (iii) a value between 0 and 1.0 for count values between the low and high limits, with the value being determined based on a function having a positive relationship between count value and probability. In examples, the Drop Probability field is stored in two bits of memory.

FIG. 4D depicts example pseudo-code used in determining whether to accept or reject a packet, in accordance with an embodiment of the disclosure. It is noted that the example pseudo-code of FIG. 4D is applicable to the exact comparison tail drop mechanism described herein and may not be applicable to the approximate comparison tail drop mechanism. As described above, tail drop logic (e.g., tail drop logic 202 illustrated in FIG. 2) is configured to implement an algorithm for determining whether a packet received at the network device should be accepted or rejected. The tail drop logic utilizes data stored in the tail drop calendar 402, which comprises a relatively fast memory, (e.g., flip-flops). As described herein, a network device includes a queue that is configured to temporarily store packets received at the network device, and a count value stored in a counter indicates a total number of packets stored on the queue or a total number of bytes contained in the packets stored on the queue. The data stored in the tail drop calendar 402 provides an indication of the count value (e.g., an indication of a fullness level of the queue) without storing the count value. Thus, the tail drop logic can make the determination of whether to accept or reject a packet received at the network device on the basis of data stored in the tail drop calendar 402 and without accessing the MSb portion of the count value stored in the slow memory. The tail drop calendar 402 is updated when the MSb portion of the count value is updated, with the fields of the tail drop calendar 402 being determined by comparing the full count value to the midpoint value (e.g., the midpoint value 440 illustrated in FIG. 4A) and to the high or low limit, depending on whether the count value is above or below the midpoint.

Example pseudo-code employed by the tail drop logic is illustrated in FIG. 4D. In the example pseudo-code, the "AMP," "AL," "BigDiff," and "Diff" variables correspond to the fields of the tail drop calendar 402, described above. As noted, these fields of the tail drop calendar 402 are updated when the MSb portion of the count value is incremented or decremented. The "CounterLSb" variable in the example pseudo-code is maintained outside of the tail drop calendar 402 and is updated each time that the LSb portion of the count value changes. The CounterLSb value indicates a net increase or decrease of the LSb portion of the count value in comparison to a value of the LSb portion at the time at which the MSb portion was last updated. In an example, the CounterLSb variable is reset to zero when the MSb portion is updated. Then, as the LSb portion of the count value changes, the CounterLSb variable is changed accordingly. Positive values of the CounterLSb variable indicate a net increase of the LSb portion of the count value, and negative values of the CounterLSb variable indicate a net decrease of the LSb portion of the count value.

As an example, at a time t=0, the MSb portion of the count value is updated, and (i) the fields of the tail drop calendar 402 are updated, and (ii) the CounterLSb variable is set to 0. At a time t=1, a packet is received at the network device. In this example, the tail drop logic accesses the data stored in the tail drop calendar 402 and determines that the packet should be accepted. The data stored in the tail drop calendar 402 is not updated (e.g., there is no indication that the MSb portion of the count value has been updated), but the CounterLSb variable is incremented to +1, indicating a net increase of "1" of the LSb portion of the count value. If the LSb portion of the count value subsequently decreases (e.g., upon transmission of packets from the network device), the CounterLSb variable is decremented accordingly, and the CounterLSb variable may take on negative values. Such negative values indicate that there has been a net decrease of the LSb portion of the count value in comparison to the value of the LSb portion at the time at which the MSb portion was last updated.

With reference again to FIG. 4D, the example pseudo-code shows that if the "above midpoint" field has a value of "true" (e.g., if (AMP==1)), then the values of the tail drop calendar 402 are relative to the high limit (e.g., the Above Limit (AL) field indicates whether the count value is above the high limit, and the Big Difference (BigDiff) field indicates whether a difference between the count value and high limit is greater than a predetermined value). Conversely, if the count value is below the midpoint value (e.g., if (AMP==0)), then the values of the tail drop calendar 402 are relative to the low limit (e.g., the AL field indicates whether the count value is above the low limit, and the BigDiff field indicates whether a difference between the count value and low limit is greater than a predetermined value).

The Drop Zone, Accept Zone, and Random Zone are listed in the pseudocode, and conditions are provided for each of the zones. If a condition associated with a zone is met, then the count value is determined as being within that zone, and the accept or reject decision is made accordingly. To illustrate this, reference is made to the Drop Zone listed in the pseudocode and the associated conditions listed therein. The conditions are separated by "OR" operators (e.g., ||), such that if one of the multiple conditions for the Drop Zone is met, then the count value is determined as being within the Drop Zone. In general, the example pseudocode shows that if the BigDiff field has a value of "true" (e.g., equal to 1), then the accept or reject decision is made based on the AMP and AL fields, and without considering the Diff field and the CounterLSb variable. Conversely, if the BigDiff field has a value of "false" (e.g., equal to 0), then the accept or reject decision takes into consideration the AMP and AL fields and the CounterLSb variable.

As described above, if the count value is determined as being within the Drop Zone, then a packet received at the network device is rejected (i.e., dropped or discarded). If the count value is determined as being within the Accept Zone, then the packet is accepted. If the count value is determined as being in the Random Zone, then the decision to accept or reject is randomized according to the Drop Probability field of the tail drop calendar 402. From the example pseudo-code of FIG. 4D, it is evident that the determination as to whether to accept or reject a packet is made without reading the MSb portion of the count value stored in the slow memory. In the example of FIGS. 4A-4D, a determination is made as to whether the count value is within the Drop Zone, Accept Zone, or Random Zone based on the count value relative to the high and low limits. In other examples having multiple counters associated with multiple queues, the decision to accept or reject is based on an average queue size. In these other examples, a determination is made as to whether the average queue size is within the Drop Zone, Accept Zone, or Random Zone based on the average queue size relative to high and low limits.

The example of FIGS. 4A-4D illustrates one implementation of the tail drop mechanism, and it is noted that other implementations may be utilized. For example, as noted above, in another implementation of the tail drop mechanism, the indication of the fullness level of the queue stored in the tail drop calendar includes one or more values that indicate how the MSb portion of the count value compares to one or more thresholds. In this example, the indication of the fullness level is not based on the LSb portion of the count value. Thus, in updating the data stored in the tail drop calendar, the MSb portion of the count value is compared to the one or more thresholds, and data stored in the tail drop calendar is updated based on one or more results of the comparing. Tail drop logic uses the data stored in the tail drop calendar in making decisions to accept or reject packets received at the network device.

It is further noted that the tail drop mechanism is implemented in a number of different manners, including the "exact comparison" tail drop mechanism and the "approximate comparison" tail drop mechanism referred to above, among others. Both the exact comparison tail drop mechanism and the approximate comparison tail drop mechanisms include comparisons of a counter value to one or more thresholds, where the comparisons provide various information. For example, results of the comparison may indicate one or more of: (1) counter value is less than a threshold, (2) counter value is greater than the threshold, (3) counter value is equal to the threshold, (4) counter value is not equal to the threshold, (5) counter value is less than or equal to the threshold, and (6) counter value is greater than or equal to the threshold.

In the approximate comparison tail drop mechanism, the MSb portion is compared to one or more thresholds. It is noted that the LSb portion of the count value is not considered in the approximate comparison tail drop mechanism, in examples. The comparisons are made each time the MSb portion of the count value is updated, and the data stored in the tail drop calendar memory is updated based on the comparisons. The comparison of the MSb portion to the one or more thresholds is used for other purposes in examples. In an example, the MSb portion of the count value is compared to a relatively low value (e.g., "1"). If the MSb portion of the count value is equal to the low value or less than the low value, then an indication that the queue is approaching an empty state is stored. In this manner, a "nearly empty" queue indication is set. The use of the "nearly empty" queue indication is described in further detail below.

In the exact comparison tail drop mechanism, the full count value including the MSb and LSb portions is compared to one or more thresholds. An example of the exact comparison tail drop mechanism is described above with reference to FIGS. 4A-4D. In the approximate comparison and exact comparison tail drop mechanisms, results of the compare operations are stored in the tail drop calendar memory. The results include 1 bit per comparison result, in an example. The tail drop calendar memory is a relatively fast memory, and decisions on whether to accept or reject packets are made on the basis of data stored in this fast memory and without accessing the MSb portion of the count value stored in the relatively slow memory.

Figure 5:
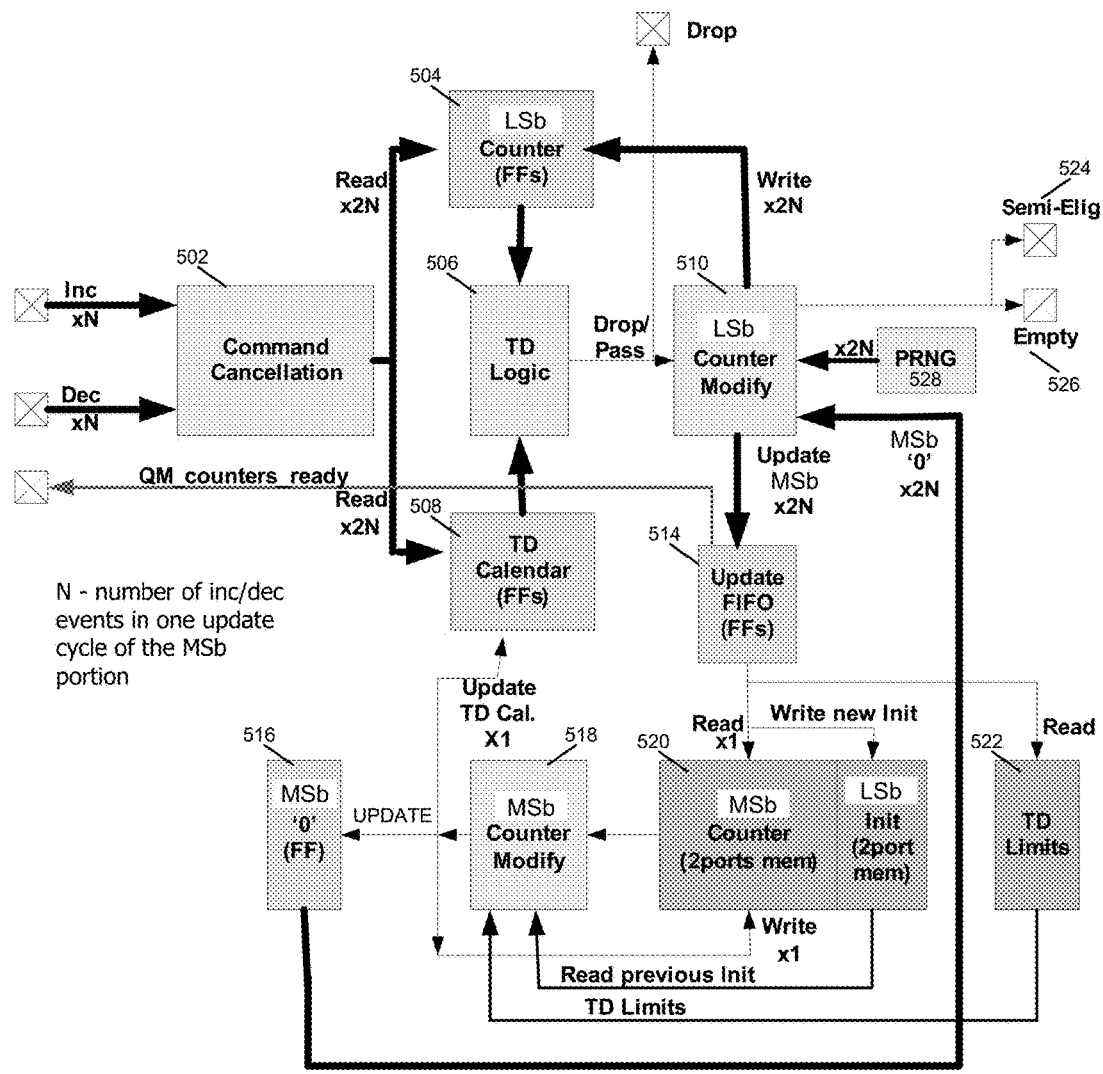
FIG. 5 is a block diagram depicting a system for counting a number of received packets and a number of bytes contained in the received packets, in accordance with an embodiment of the disclosure.

FIG. 5 is a block diagram depicting a system for counting a number of received packets and a number of bytes contained in the received packets, in accordance with an embodiment of the disclosure. The system of FIG. 5 may be referred to as a "counter block." In this figure, a fast memory 504 comprising an array of flip-flops is configured as a first counter that stores a least significant bit (LSb) portion of a count value. The LSb counter is implemented in flip-flops in order to utilize their high access bandwidth, as noted above. The LSb counter has 2*N read ports and 2*N write ports, with N being an integer value, in examples. A slow memory 520 comprising SRAM (e.g., 2-port SRAM) is configured as a second counter that stores a most significant bit (MSb) portion of the count value. Whenever there is data in update FIFO 514, the MSb portion of the count value stored in the slow memory 520 is read, modified (i.e., increment or decrement), and written back to the slow memory 520. The modifying of the MSb portion of the count value in this manner is performed by the MSb counter modify block 518, in embodiments. The update FIFO 514 is implemented using an array of flip-flops, in an example, and is described in further detail below. The MSb portion of the count value is selectively incremented or decremented by 1, based on the command stored on the update FIFO 514. Specifically, if the update FIFO 514 provides an "increment" command, the MSb portion is incremented by 1. When the update FIFO 514 provides a "decrement" command, the MSb portion is decremented by 1.

Tail drop logic 506 is configured to implement an algorithm for determining whether a packet received at the network device should be accepted or rejected. In an embodiment, the tail drop logic 506 implements the algorithm described above with reference to FIG. 4D. In determining whether a packet should be accepted or rejected, the tail drop logic 506 utilizes data stored in the tail drop calendar 508. In the example of FIG. 5, the tail drop calendar 508 comprises an array of flip-flops. Whenever the MSb counter of the slow memory 520 is updated, the tail drop calendar 508 is also updated by comparing the count value or a portion of the count value to one or more thresholds, as described above. The one or more thresholds are stored in a tail drop limits memory 522 in the example of FIG. 5. The memory 522 is read whenever there is new data coming from the update FIFO 514 and is used by the tail drop calendar 508 update logic in making determinations of whether to accept or reject packets received at the network device.

The tail drop logic 506 makes a decision to accept or reject a packet received at the network device and transmits a corresponding "drop" or "pass" (e.g., "reject" or "accept") command to an LSb counter modify block 510. The LSb counter modify block 510 increments the LSb counter value if the packet is accepted. When the LSb counter stored in the fast memory 504 wraps around from a high value to a low value (e.g., a "full" wrap-around event occurs), an "increment" command is added to the update FIFO 514. Likewise, when the LSb counter stored in the fast memory 504 wraps around from a low value to a high value (e.g., an "empty" wrap-around event occurs), a "decrement" command is added to the update FIFO 514. In the example of FIG. 5, the LSb counter modify block 510 thus commands the updating of the MSb counter of the slow memory 520 by adding an entry to the update FIFO 514. When the increment or decrement command is added to the update FIFO 514, a new random value is taken from pseudorandom number generator (PRNG) block 528. The random value is used as a new reset value to the LSb counter stored in the fast memory 504 and is also sent to the update FIFO 514 for updating an LSb counter stored in the slow memory 520. In an example, the PRNG block 528 generates N new pseudorandom numbers every clock cycle.

As indicated above, the update FIFO 514 is implemented using an array of flip-flops, in an example. In some embodiments, the update FIFO 514 has 2*N write ports and one read port. When a fill level of the update FIFO 514 reaches a limit (e.g., the fill level reaches update_fifo_full_limit), a QM_counters_ready signal is de-asserted, and new increment and decrement events are not accepted anymore by the counter block. The size of the update FIFO 514 is large enough to absorb increment and decrement events that are still in the counter block's pipe (which includes all the blocks from the I/F to the update FIFO 514 input) when the QM_counters_ready signal is de-asserted. In an example, the size of the update FIFO 514 is equal to the sum of update_fifo_full_limit and latency of all blocks from input to the update FIFO 514.

In an example, multiple clients seek to increment or decrement the count value maintained across the slow and fast memories 504, 520. A command cancellation block 502 receives N increment inputs and N decrement inputs from the multiple clients, such that the block 502 supports 2*N channels. The command cancellation block 502 is responsible for cancelling increment and decrement events both "horizontally" and "vertically." Vertical cancellation means that in each clock cycle, there is an increment or decrement command to a counter in one pipe only. There cannot be an increment/decrement command to a counter in more than one pipe, because this would create a contention on the LSb counter database. Horizontal cancellation means that in each pipe, there must be at least M clock cycles between increment or decrement events to the same counter. M is determined by the counter modify path (Read-Modify-Write) which includes the tail drop logic 506 and the LSb counter modify block 510.

In embodiments, the MSb counter stored in the slow memory 520 is incremented or decremented by 1 upon occurrence of a wrap-around event in the fast memory 504. As noted above, whenever there is data in update FIFO 514, the MSb portion of the count value stored in the slow memory 520 is read, modified (i.e., increment or decrement), and written back to the slow memory 520. Such steps are performed by the MSb counter modify block 518, in embodiments. In an example, for an increment event, the MSb counter is incremented by (counter_full_value−previous_lsb_init_value). The previous_lsb_init_value is read from the "LSb Init Memory" of the slow memory 520. For a decrement event, the MSb counter is decremented by previous_lsb_init_value, in some examples. The new LSb initialization value, which was generated by the PRNG block 528, is read from the update FIFO 514 and written to the LSb Init Memory of the slow memory 520.

An MSb '0' indication 516 is implemented in flip-flops. This indication 516 is used for "empty" and "semi-eligibility" events, which are described below. When the MSb '0' indication 516 is set, this means that the MSb counter equals zero. The indication 516 is updated whenever the MSb counter is modified. The empty event 526 is de-asserted (e.g., set equal to zero) whenever the counter is incremented. The empty event 526 is asserted (e.g., set equal to one) whenever the MSb '0' indication 516 is asserted and the LSb counter equals zero. The semi-eligibility event 524 is used to prevent the counter from being decremented when it has a value of zero (e.g., both LSb and MSb portions of the counter are equal to zero). The counter block of FIG. 5 supports increment and decrement events every clock cycle. When the counter value equals zero, the empty event 526 is generated. Upon empty assertion, there should not be new decrement events in the design pipe. However, due to design latency, the empty event 526 cannot be generated in zero time. The semi-eligibility event 524 is designed to address this situation and is used to indicate to the client that generates the decrement event that counters are "nearly empty." When the semi-eligibility event 524 is asserted (e.g., set equal to one), the client is forced to generate decrement events at a slow rate, e.g., one decrement event every K clock cycles. The value K is determined by the latency of updating the LSb counter. The semi-eligibility event 524 is asserted when the MSb '0' indication is asserted and the LSb value equals a "semi_elig_limit." The semi_elig_limit is determined by the latency of updating the LSb counter. The semi_elig_limit is an example of a threshold used in the systems and methods described herein. In the subject matter described herein, various thresholds are used. Such thresholds can be compared against exact counter values (i.e., including both MSb and LSb portions) or against approximated counter values (e.g., MSb portion only). Additionally, a single threshold can have multiple applications. In examples, the semi_elig_limit threshold is used for both a tail drop application and to determine if the semi-eligibility event 524 should be asserted.

Figure 6:
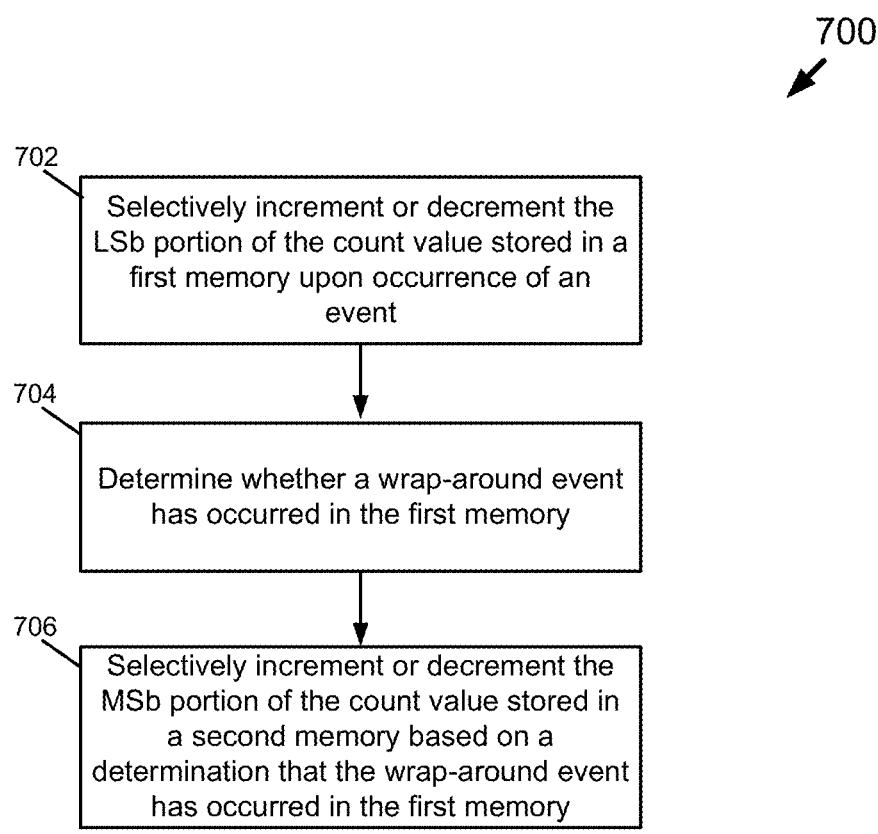
FIG. 6 is a flow diagram depicting steps of a method for maintaining a count value having an LSb portion and an MSb portion, in accordance with an embodiment of the disclosure.

FIG. 6 is a flow diagram 700 depicting steps of a method for maintaining a count value having an LSb portion and an MSb portion, in accordance with an embodiment of the disclosure. At 702, the LSb portion of the count value stored in a first memory is selectively incremented or decremented upon occurrence of an event. At 704, a determination is made as to whether a wrap-around event has occurred in the first memory. At 706, the MSb portion of the count value stored in a second memory is selectively incremented or decremented based on a determination that the wrap-around event has occurred in the first memory.

Figure 7:
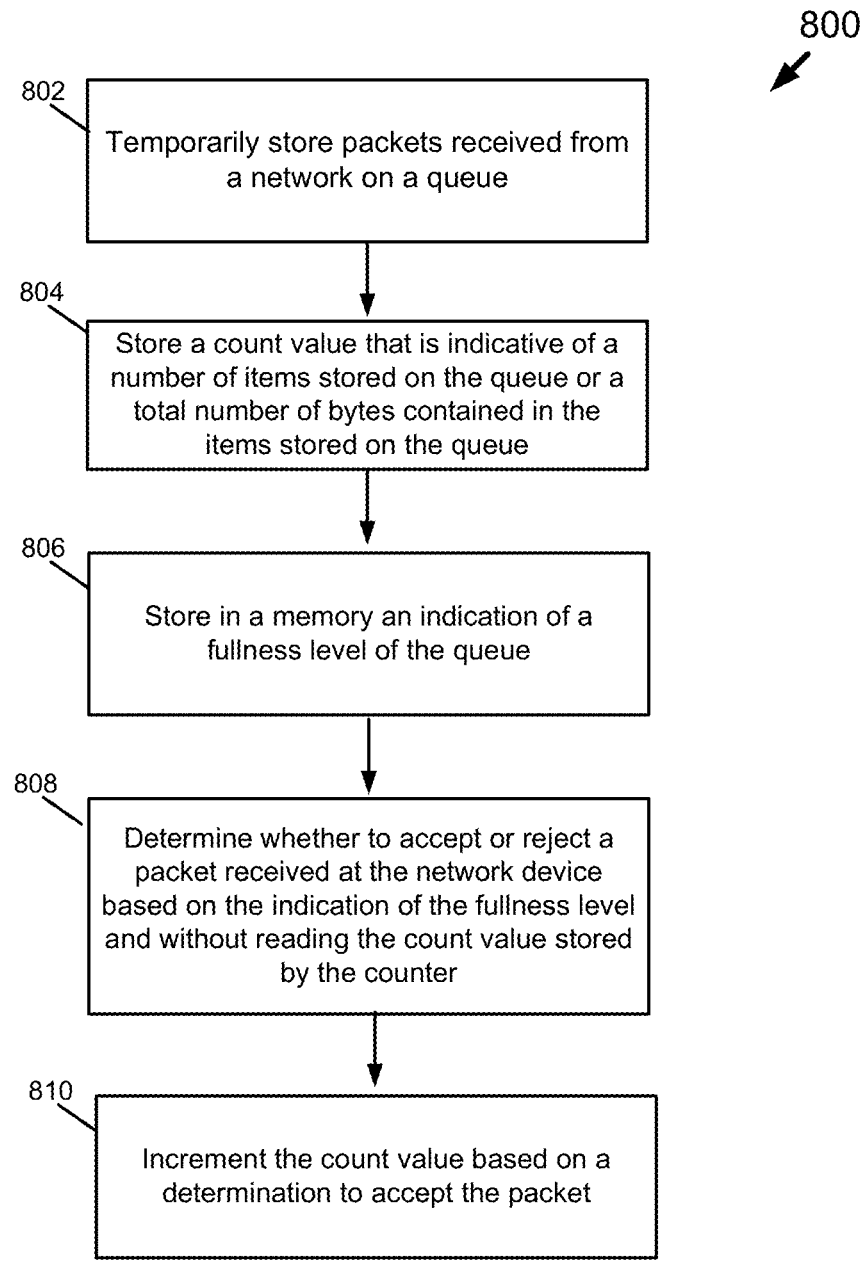
FIG. 7 is a flow diagram depicting steps of a method for managing a queue, in accordance with an embodiment of the disclosure.

FIG. 7 is a flow diagram 800 depicting steps of a method for managing a queue, in accordance with an embodiment of the disclosure. At 802, packets received from a network are temporarily stored on a queue. At 804, a count value is stored in a counter. The count value indicates a number of items stored on the queue or a total number of bytes contained in the items stored on the queue. At 806, an indication of a fullness level of the queue is stored in a memory, and the indication does not include the count value. At 808, a determination of whether to accept or reject a packet received at the network device is based on the indication of the fullness level and without reading the count value stored by the counter. At 810, the count value is incremented based on a determination to accept the packet.

This application uses examples to illustrate the invention. The patentable scope of the invention may include other examples.

What is claimed is:

1. A network device comprising:
   a queue for temporarily storing packets received from a network;
   a counter configured to store a count value that is indicative of a number of items stored in the queue or a total number of bytes contained in the items stored in the queue, the counter storing at least a portion of the count value in a counter memory; and
   a tail drop calendar module comprising (i) a tail drop calendar memory configured to store an indication of a fullness level of the queue without storing the count value, wherein retrieval of the indication of fullness level of the queue from the tail drop calendar memory is faster than retrieval of the count value from the counter, and (ii) update circuitry configured to determine whether to accept or reject a packet received at the network device based on the indication of the fullness level stored in the tail drop calendar memory and without accessing the counter memory, the count value being incremented based on a determination to accept the packet.

2. The network device of claim 1, wherein the update circuitry is configured to determine whether to accept or reject the packet based on the indication of the fullness level and without reading the count value stored by the counter.

3. The network device of claim 1, wherein the counter comprises a relatively slow memory, and wherein the tail drop calendar memory comprises a relatively fast memory.

4. The network device of claim 1, wherein the indication of the fullness level comprises one or more values, the one or more values indicating how the count value or a portion of the count value compares to one or more thresholds.

5. The network device of claim 4, wherein the count value includes a least significant bit (LSb) portion and a most significant bit (MSb) portion, the one or more values indicating how the MSb portion compares to the one or more thresholds.

6. The network device of claim 1, wherein the count value includes a least significant bit (LSb) portion and a most significant bit (MSb) portion, the counter comprising:
   a relatively fast counter memory configured to store the LSb portion of the count value; and
   a relatively slow counter memory configured to store the MSb portion of the count value, the MSb portion being updated upon occurrence of a wrap-around event in the relatively fast memory, wherein:
   data stored in the memory of the tail drop calendar module is updated when the MSb portion of the count value is updated.

7. The network device of claim 6, wherein the updating of the data stored in the memory of the tail drop calendar module comprises (i) comparing the MSb portion of the count value to one or more threshold values, and (ii) updating the data stored in the tail drop calendar memory based on one or more results of the comparing.

8. The network device of claim 6, wherein the updating of the data stored in the tail drop calendar memory comprises (i) comparing the count value stored across the relatively slow counter memory and the relatively fast counter memory to one or more threshold values, and (ii) updating the data stored in the tail drop calendar memory based on one or more results of the comparing.

9. The network device of claim 1, wherein the tail drop calendar memory is configured to store (i) a first indication of whether the count value is within a threshold of a high or low limit value, (ii) a second indication of whether the count value is above or below the high or low limit value, and (iii) a difference of the count value from the high or low limit value, the update circuitry being configured to determine whether to accept or reject the packet based on one or more of the first indication, the second indication, and the difference.

10. The network device of claim 9, wherein when the first indication indicates that the count value is not within the threshold of the high or low limit value, the update circuitry is configured to determine whether to accept or reject the packet based on the second indication and without considering the difference.

11. The network device of claim 1, wherein the indication of the fullness level comprises fewer bits of data than the count value.

12. The network device of claim 1,
   wherein the indication of the fullness level indicates how the count value or a portion of the count value compares to an upper threshold and a lower threshold,
   wherein the update circuitry determines that the packet should be accepted when the indication indicates that the count value or the portion of the count value is below the upper threshold and below the lower threshold,
   wherein the update circuitry determines that the packet should be rejected when the indication indicates that the count value or the portion of the count value is above the upper threshold and above the lower threshold, and
   wherein the update circuitry determines whether to accept or reject the packet based on a probability value stored in the memory when the indication indicates that the count value or the portion of the count value is above the lower threshold and below the upper threshold.

13. A method for managing a queue of a network device, the method comprising:
   temporarily storing packets received from a network in a queue;
   storing a count value that is indicative of a number of items stored in the queue or a total number of bytes contained in the items stored in the queue, the count value being stored in a counter memory;
   storing in a tail drop calendar memory an indication of a fullness level of the queue, the indication not including the count value, wherein retrieval of the indication of fullness level of the queue from the tail drop calendar memory is faster than retrieval of the count value from the counter;

determining whether to accept or reject a packet received at the network device based on the indication of the fullness level stored in the tail drop calendar memory, without accessing the counter memory, and without reading the count value stored by the counter memory; and incrementing the count value based on a determination to accept the packet.

14. The method of claim 13, wherein:

the storing the count value comprises storing at least a portion of the count value on a relatively slow counter memory;

the storing the indication in the tail drop calendar memory comprises storing the indication in a relatively fast tail drop calendar memory; and the determining whether to accept or reject the packet (i) is based on the indication of the fullness level stored in the relatively fast tail drop calendar memory, and (ii) is made without accessing the relatively slow counter memory.

15. The method of claim 13, wherein the count value includes a least significant bit (LSb) portion and a most significant bit (MSb) portion, the counter including (i) a relatively fast counter memory configured to store the LSb portion of the count value, and (ii) a relatively slow memory configured to store the MSb portion of the count value, the method further comprising:

updating the MSb portion of the count value upon occurrence of a wrap-around event in the relatively fast counter memory; and updating the indication of the fullness level stored in the tail drop calendar memory when the MSb portion of the count value is updated.

16. The method of claim 15, wherein the updating of the indication of the fullness level stored in the tail drop calendar memory comprises:

comparing the MSb portion of the count value to one or more threshold values; and updating data stored in the tail drop calendar memory based on one or more results of the comparing, wherein the data is updated without accessing the LSb portion of the count value stored in the relatively fast counter memory.

17. The method of claim 15, wherein the updating of the indication of the fullness level stored in the tail drop calendar memory comprises:

comparing the count value stored across the relatively slow counter memory and the relatively fast counter memory to one or more threshold values; and updating data stored in the tail drop calendar memory based on one or more results of the comparing.

18. The method of claim 13, wherein the indication of the fullness level indicates how the count value or a portion of the count value compares to an upper threshold and a lower threshold, the method further comprising:

determining that the packet should be accepted when the indication indicates that the count value or the portion of the count value is below the upper threshold and below the lower threshold;

determining that the packet should be rejected when the indication indicates that the count value or the portion of the count value is above the upper threshold and above the lower threshold; and determining whether to accept or reject the packet based on a probability value stored in the tail drop calendar memory when the indication indicates that the count value or the portion of the count value is above the lower threshold and below the upper threshold.

19. The method of claim 13, wherein the tail drop calendar memory is configured to store (i) a first indication of whether the count value is within a threshold of a high or low limit value, (ii) a second indication of whether the count value is above or below the high or low limit value, and (iii) a difference of the count value from the high or low limit value, the update circuitry being configured to determine whether to accept or reject the packet based on one or more of the first indication, the second indication, and the difference.

20. The method of claim 19, further comprising:

determining whether to accept or reject the packet based on the second indication and without considering the difference when the first indication indicates that the count value is not within the threshold of the high or low limit value.

* * * * *